(12) United States Patent
Lair (10) Patent No.: US 8,091,827 B2
(45) Date of Patent: Jan. 10, 2012

(54) THRUST REVERSER DOOR

(75) Inventor: Jean-Pierre Lair, San Antonio, TX (US)

(73) Assignee: The NORDAM Group, Inc., Tulsa, OK (US)

( * ) Notice: Subject to any disclaimer, the term of this patent is extended or adjusted under 35 U.S.C. 154(b) by 1011 days.

(21) Appl. No.: 11/941,360

(22) Filed: Nov. 16, 2007

(65) Prior Publication Data

US 2009/0126339 A1    May 21, 2009

(51) Int. Cl.
*F02K 1/54* (2006.01)
(52) U.S. Cl. .................................. 244/110 B; 60/226.2
(58) Field of Classification Search .............. 60/226.2; 244/110 B
See application file for complete search history.

(56) References Cited

U.S. PATENT DOCUMENTS

| | | |
|---|---|---|
| 2,847,823 A | 8/1958 | Brewer |
| 3,347,578 A | 10/1967 | Sheehan et al. |
| 3,492,821 A | 2/1970 | Monaghan et al. |
| 3,541,794 A | 11/1970 | Johnston et al. |
| 3,550,855 A | 12/1970 | Feld et al. |
| 3,610,534 A | 10/1971 | Medawar |
| 3,640,468 A | 2/1972 | Searle et al. |
| 3,660,982 A | 5/1972 | Gozlan |
| 3,684,182 A | 8/1972 | Maison |
| 3,856,239 A | 12/1974 | Leibach |
| 4,047,381 A | 9/1977 | Smith |
| 4,093,122 A | 6/1978 | Linderman et al. |
| 4,129,269 A | 12/1978 | Fage |
| 4,147,027 A | 4/1979 | Greathouse |
| 4,175,385 A | 11/1979 | Nash |
| 4,182,501 A | 1/1980 | Fage |
| 4,212,442 A | 7/1980 | Fage |
| 4,232,516 A | 11/1980 | Lewis et al. |
| 4,292,803 A | 10/1981 | Prior |
| 4,362,015 A | 12/1982 | Fage |
| 4,422,605 A | 12/1983 | Fage |
| 4,424,669 A | 1/1984 | Fage |
| 4,519,561 A | 5/1985 | Timms |
| 4,581,890 A | 4/1986 | Giraud |
| 4,682,733 A | 7/1987 | Newton |
| 4,801,112 A | 1/1989 | Fournier |
| 4,830,519 A | 5/1989 | Starke |
| 4,836,451 A | 6/1989 | Herrick et al. |
| 4,860,956 A | 8/1989 | Fage |

(Continued)

FOREIGN PATENT DOCUMENTS

EP        0809010 A1    11/1997

(Continued)

OTHER PUBLICATIONS

U.S. Appl. No. 11/941,378, filed Nov. 16, 2007, entitled "Thrust Reverser for a Turbofan Gas Turbine Engine", by Jean-Pierre Lair.

(Continued)

*Primary Examiner* — Timothy D Collins
*Assistant Examiner* — Steven Hawk
(74) *Attorney, Agent, or Firm* — Francis L. Conte (57) ABSTRACT

A thrust reverser door provides in one aspect a separation of structural and aerodynamic functions through the provision of individual structures. In some embodiments, an aerodynamic element is adjustable in position, while in other embodiments, the relative positions are fixed. An exemplary aerodynamic element extends radially into the reverser flow to redirect the flow away from the door surface.

27 Claims, 5 Drawing Sheets

U.S. PATENT DOCUMENTS

| | | | |
|---|---|---|---|
| 4,865,256 A | 9/1989 | Durand | |
| 4,894,985 A * | 1/1990 | Dubois et al. | 60/226.2 |
| 4,909,346 A | 3/1990 | Torkelson | |
| 4,914,905 A | 4/1990 | Dubois | |
| 4,916,895 A | 4/1990 | Dubois | |
| 4,922,712 A | 5/1990 | Matta | |
| 4,922,713 A | 5/1990 | Barbarin | |
| 4,960,243 A | 10/1990 | Dubois | |
| 4,966,327 A | 10/1990 | Fage et al. | |
| 4,976,466 A * | 12/1990 | Vauchel | 239/265.29 |
| 4,998,409 A | 3/1991 | Mutch | |
| 5,003,770 A | 4/1991 | Schegerin | |
| 5,039,171 A | 8/1991 | Lore | |
| 5,040,730 A | 8/1991 | Hogie | |
| 5,083,426 A | 1/1992 | Layland | |
| 5,090,197 A | 2/1992 | Dubois | |
| 5,097,661 A | 3/1992 | Lair et al. | |
| 5,101,621 A | 4/1992 | Mutch | |
| 5,117,630 A | 6/1992 | Cariola | |
| 5,120,004 A | 6/1992 | Matthias | |
| 5,167,118 A | 12/1992 | Torkelson | |
| 5,176,340 A | 1/1993 | Lair | |
| 5,181,676 A * | 1/1993 | Lair | 244/110 B |
| 5,192,023 A | 3/1993 | Fage et al. | |
| 5,197,693 A | 3/1993 | Remlaoui | |
| 5,203,525 A | 4/1993 | Remlaoui | |
| 5,209,057 A | 5/1993 | Remlaoui | |
| 5,211,008 A | 5/1993 | Fage | |
| 5,221,048 A | 6/1993 | Lair | |
| 5,224,342 A | 7/1993 | Lair | |
| 5,228,641 A | 7/1993 | Remlaoui | |
| 5,230,213 A | 7/1993 | Lawson | |
| 5,243,817 A | 9/1993 | Matthias | |
| 5,251,435 A | 10/1993 | Pauley | |
| 5,267,438 A | 12/1993 | Bunel | |
| 5,284,015 A | 2/1994 | Carimali | |
| 5,297,387 A | 3/1994 | Carimali | |
| 5,309,711 A | 5/1994 | Matthias | |
| 5,310,117 A | 5/1994 | Fage et al. | |
| 5,347,808 A * | 9/1994 | Standish et al. | 60/226.2 |
| 5,372,006 A | 12/1994 | Lair | |
| 5,390,879 A * | 2/1995 | Lair | 244/110 B |
| 5,392,991 A | 2/1995 | Gatti | |
| 5,396,762 A | 3/1995 | Standish | |
| 5,419,515 A | 5/1995 | Lair | |
| 5,440,875 A | 8/1995 | Torkelson | |
| 5,473,886 A | 12/1995 | Lebrun | |
| 5,524,431 A | 6/1996 | Brusson | |
| 5,548,954 A | 8/1996 | de Cambray | |
| 5,558,594 A | 9/1996 | Lefranc | |
| 5,615,549 A | 4/1997 | Valleroy | |
| 5,615,834 A | 4/1997 | Osman | |
| 5,655,360 A | 8/1997 | Butler | |
| 5,666,802 A | 9/1997 | Lair | |
| 5,671,598 A | 9/1997 | Standish | |
| 5,716,025 A | 2/1998 | Meyer | |
| 5,720,449 A | 2/1998 | Laboure | |
| 5,725,182 A | 3/1998 | Valleroy | |
| 5,727,380 A | 3/1998 | Lardy et al. | |
| 5,730,392 A | 3/1998 | Lair | |
| 5,765,362 A | 6/1998 | Gonidec | |
| 5,775,097 A | 7/1998 | Lardy | |
| 5,775,639 A | 7/1998 | Fage | |
| 5,778,659 A | 7/1998 | Duesler | |
| 5,778,660 A | 7/1998 | Jean | |
| 5,779,192 A | 7/1998 | Metezeau et al. | |
| 5,782,434 A | 7/1998 | Jean | |
| 5,785,249 A | 7/1998 | Metezeau | |
| 5,794,433 A | 8/1998 | Peters | |
| 5,799,903 A | 9/1998 | Vauchel | |
| 5,806,302 A | 9/1998 | Cariola | |
| 5,813,220 A | 9/1998 | Portal | |
| 5,819,527 A | 10/1998 | Fournier | |
| 5,819,528 A | 10/1998 | Masson | |
| 5,826,823 A | 10/1998 | Lymons | |
| 5,836,149 A | 11/1998 | Servanty | |
| 5,852,928 A | 12/1998 | Vauchel | |
| 5,853,148 A | 12/1998 | Standish | |
| 5,863,014 A | 1/1999 | Standish | |
| 5,875,995 A * | 3/1999 | Moe et al. | 244/110 B |
| 5,893,265 A | 4/1999 | Gonidec | |
| 5,899,059 A | 5/1999 | Gonidec | |
| 5,904,041 A | 5/1999 | Dhainault | |
| 5,913,476 A | 6/1999 | Gonidec | |
| 5,927,647 A | 7/1999 | Masters | |
| 5,930,991 A | 8/1999 | Fournier | |
| 5,934,613 A | 8/1999 | Standish | |
| 5,937,636 A | 8/1999 | Gonidec | |
| 5,947,625 A | 9/1999 | Vauchel | |
| 5,956,939 A | 9/1999 | Fage | |
| 5,960,626 A | 10/1999 | Baudu | |
| 5,967,460 A | 10/1999 | Baudu | |
| 5,970,704 A | 10/1999 | Lardy | |
| 5,974,783 A | 11/1999 | Gonidec | |
| 5,983,625 A | 11/1999 | Gonidec | |
| 5,987,881 A | 11/1999 | Gonidec | |
| 5,996,937 A | 12/1999 | Gonidec | |
| 5,997,054 A | 12/1999 | Baudu | |
| 6,000,216 A | 12/1999 | Vauchel | |
| 6,009,702 A | 1/2000 | Gonidec | |
| 6,026,638 A | 2/2000 | Gonidec | |
| 6,027,071 A | 2/2000 | Lair | |
| 6,029,439 A | 2/2000 | Gonidec | |
| 6,032,901 A | 3/2000 | Carimali | |
| 6,044,641 A | 4/2000 | Baudu | |
| 6,045,091 A | 4/2000 | Baudu | |
| 6,065,285 A | 5/2000 | Gonidec | |
| 6,068,213 A | 5/2000 | Gonidec | |
| 6,076,347 A | 6/2000 | Gonidec | |
| 6,079,201 A | 6/2000 | Jean | |
| 6,082,096 A | 7/2000 | Vauchel | |
| 6,094,908 A | 8/2000 | Baudu | |
| 6,101,807 A | 8/2000 | Gonidec | |
| 6,105,439 A | 8/2000 | Roger | |
| 6,145,301 A | 11/2000 | Gonidec | |
| 6,145,786 A | 11/2000 | Baudu | |
| 6,148,607 A | 11/2000 | Baudu | |
| 6,151,884 A | 11/2000 | Gonidec | |
| 6,151,885 A | 11/2000 | Metezeau | |
| 6,151,886 A | 11/2000 | Vauchel | |
| 6,158,211 A | 12/2000 | Gonidec | |
| 6,170,254 B1 | 1/2001 | Cariola | |
| 6,170,255 B1 | 1/2001 | Gonidec | |
| 6,173,807 B1 | 1/2001 | Welch et al. | |
| 6,216,980 B1 | 4/2001 | Baudu | |
| 6,237,325 B1 | 5/2001 | Hogie | |
| 6,256,979 B1 | 7/2001 | Fournier | |
| 6,260,801 B1 | 7/2001 | Peters | |
| 6,276,026 B1 | 8/2001 | Wille | |
| 6,293,495 B1 * | 9/2001 | Aten et al. | 244/110 B |
| 6,357,672 B1 | 3/2002 | Cowan et al. | |
| 6,385,964 B2 | 5/2002 | Jean | |
| 6,402,092 B1 | 6/2002 | Jean | |
| 6,438,942 B2 | 8/2002 | Fournier | |
| 6,487,845 B1 | 12/2002 | Modglin | |
| 6,546,715 B1 | 4/2003 | Blevins | |
| 6,546,716 B2 | 4/2003 | Lair | |
| 6,568,172 B2 | 5/2003 | Jannetta et al. | |
| 6,584,763 B2 | 7/2003 | Lymons | |
| 6,592,074 B2 | 7/2003 | Dehu | |
| 6,622,964 B2 | 9/2003 | Rouyer | |
| 6,688,098 B2 | 2/2004 | Rouyer | |
| 6,688,099 B2 | 2/2004 | Lair | |
| 6,751,944 B2 * | 6/2004 | Lair | 60/226.3 |
| 6,786,038 B2 | 9/2004 | Lair | |
| 6,804,947 B2 | 10/2004 | Le Docte | |
| 6,820,410 B2 | 11/2004 | Lair | |
| 6,845,607 B2 | 1/2005 | Lair | |
| 6,845,946 B2 | 1/2005 | Lair | |
| 6,895,742 B2 | 5/2005 | Lair et al. | |
| 6,910,328 B1 | 6/2005 | Joyce | |
| 6,926,234 B2 | 8/2005 | Colotte | |
| 6,938,408 B2 | 9/2005 | Lair | |
| 6,945,031 B2 | 9/2005 | Lair | |
| 6,966,175 B2 | 11/2005 | Lair | |
| 6,968,675 B2 | 11/2005 | Ramlaoui et al. | |
| 6,971,229 B2 | 12/2005 | Lair | |

| | | |
|---|---|---|
| 6,976,352 B2 | 12/2005 | Lair |
| 6,983,588 B2 | 1/2006 | Lair |
| 6,993,819 B2 | 2/2006 | Homann |
| 7,007,454 B2 | 3/2006 | Dehu |
| 7,010,905 B2 | 3/2006 | Lair |
| 7,043,897 B2 | 5/2006 | Osman |
| 7,055,329 B2 | 6/2006 | Martens et al. |
| 7,093,793 B2 | 8/2006 | Lair |
| 7,127,880 B2 | 10/2006 | Lair |
| 7,146,796 B2 | 12/2006 | Lair |
| 7,229,247 B2 | 6/2007 | Durocher et al. |
| 7,255,307 B2 | 8/2007 | Mayes |
| RE39,972 E | 1/2008 | Royalty |
| 2004/0139726 A1 | 7/2004 | Colotte |
| 2005/0151012 A1 | 7/2005 | Lair |
| 2005/0183894 A1 | 8/2005 | Lair |
| 2006/0005530 A1 | 1/2006 | Blin |
| 2006/0288688 A1 | 12/2006 | Lair |
| 2008/0072570 A1 | 3/2008 | Lair |

FOREIGN PATENT DOCUMENTS

| | | |
|---|---|---|
| FR | 2601077 | 1/1988 |
| WO | 86/00862 A1 | 2/1986 |

OTHER PUBLICATIONS

U.S. Appl. No. 11/941,371, filed Nov. 16, 2007, entitled "Pivoting Door Thrust Reverser for a Turbofan Gas Turbine Engine", by Jean-Pierre Lair.

U.S. Appl. No. 11/941,395, filed Nov. 16, 2007, entitled "Pivoting Fairings for a Thrust Reverser", by Jean-Pierre Lair.

U.S. Appl. No. 11/941,391, filed Nov. 16, 2007, entitled "Thrust Reverser Door", by Jean-Pierre Lair.

U.S. Appl. No. 11/941,388, filed Nov. 16, 2007, entitled "Thrust Reverser", by Jean-Pierre Lair.

U.S. Appl. No. 12/142,084, filed Jun. 19, 2008, entitled "Thrust Reverser for a Turbofan Gas Turbine Engine", by Jean-Pierre Lair and Paul Weaver.

* cited by examiner

THRUST REVERSER DOOR

TECHNICAL FIELD

The invention relates to a thrust reverser for a turbofan gas turbine engine, and in particular to a thrust reverser door.

BACKGROUND

The length of a thrust reverser's door is one of the design parameters which is important, as it plays a direct role in the thrust reverser's effectiveness and efficiency. The deployed doors deflect air to create a drag force for slowing down the aircraft, and the size of the deployed door therefore tends to affect the amount of drag generated (i.e. braking performance).

However, a trade-off exists, as larger doors tend to be heavier and introduce more losses when stowed, and so it is generally required to optimize door length to obtain acceptable performance and efficiency.

It is therefore desirable to, among other things, have a thrust reverser door which provides improved performance while decreasing losses.

SUMMARY

In one aspect, the present concept provides a thrust reverser having at least one thrust reverser door, the door comprising a transverse leading edge having a first, second and third frames axially spaced apart from one another and disposed circumferentially adjacent said leading edge, the first, second and third frames projecting inwardly from an interior side of the door, the third frame mounted to the first and second frames, the third frame extending inwardly beyond inward terminal edges of the first and second frames.

In another aspect, the present concept provides a thrust reverser for a turbofan gas turbine engine, the thrust reverser having at least one door movable between a stowed position and a deployed position for deflecting engine thrust, the at least one door having a leading edge with a deflector wall adjustable in position, the wall generally parallel to the leading edge and extending generally radially inwardly of the at least one door to, in use, redirect engine thrust.

In another aspect, the present concept provides a thrust reverser comprising at least one door for deflecting engine thrust, the door having a leading edge and a single skin in a vicinity of the leading edge, the door having at least a first bulkhead extending radially inwardly from the skin, the first bulkhead defining a first member extending generally parallel to the leading edge of the door and being sized and configured relative to the skin to structurally stiffen the skin, the door also having at least a second member extending radially relative to the skin and disposed adjacent the first member, the second member having a radial height relative to the skin which is greater than a radial height of the first member.

In another aspect, the present concept provides a method of adjusting an effective length of a thrust reverser door, the method comprising: mounting a substantially radially projecting member inside the thrust reverser door generally parallel and adjacent to a leading edge of the door; deflecting gases with the member during a thrust reversal mode; and changing a position of the member relative to the door to thereby change an aerodynamic effective length of the door.

Further details of these and other aspects of the improvements presented herein will be apparent from the detailed description and appended figures.

DETAILED DESCRIPTION

Figure 1:
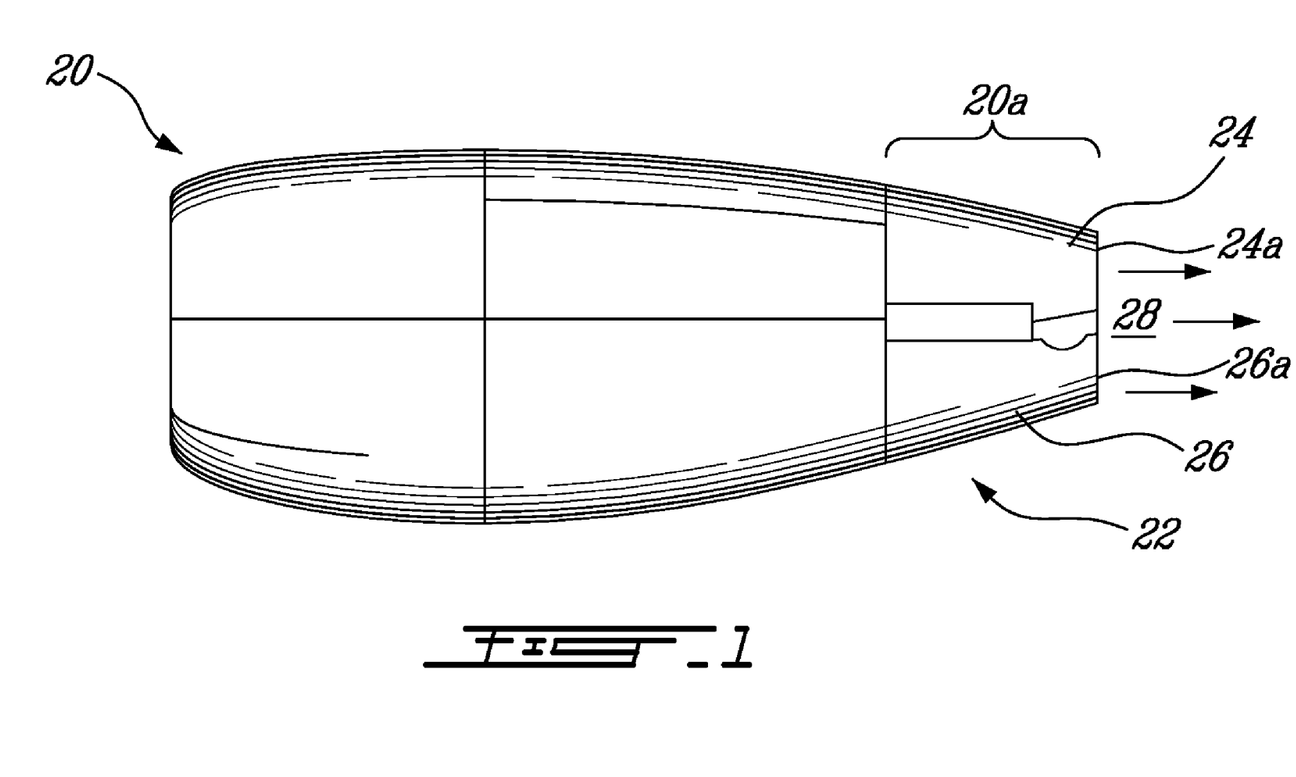
FIG. 1 is a side view of an example of a nacelle provided with a thrust reverser, its doors being shown in a stowed position.

Referring to FIG. 1, there is shown an example of a nacelle 20 including a target/bucket door type thrust reverser 22 in the aft section 20*a* of the nacelle 20. The turbofan gas turbine engine is located within the nacelle 20 and the nacelle 20 is attached under the wings or on the fuselage of the aircraft using an appropriate arrangement (not shown).

The thrust reverser 22 comprises two opposite pivoting doors 24, 26 forming most of the exhaust nozzle of the nacelle 20 when they are in their stowed position. In the example illustrated in FIG. 1, one door 24 is at the upper side and the other door 26 is at the bottom side.

Each door 24, 26 has a trailing edge 24*a*, 26*a* adjacent to the propulsive jet outlet 28. The arrows in FIG. 1 show the direct thrust operation of the engine. The trailing edges 24*a*, 26*a* cooperate with the trailing edge of side arms 32 of a jet pipe 30 located inside the aft section 20*a* of the nacelle 20 and to which the doors 24, 26 are pivotally connected.

Figure 2:
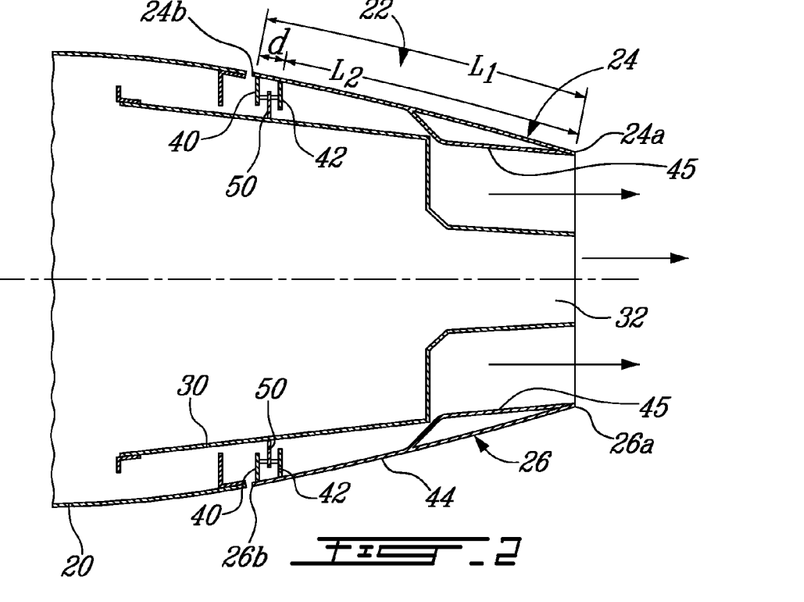
FIG. 2 is a schematic view showing an example of the present thrust reverser doors in a stowed position around a jet pipe.
Figure 3:
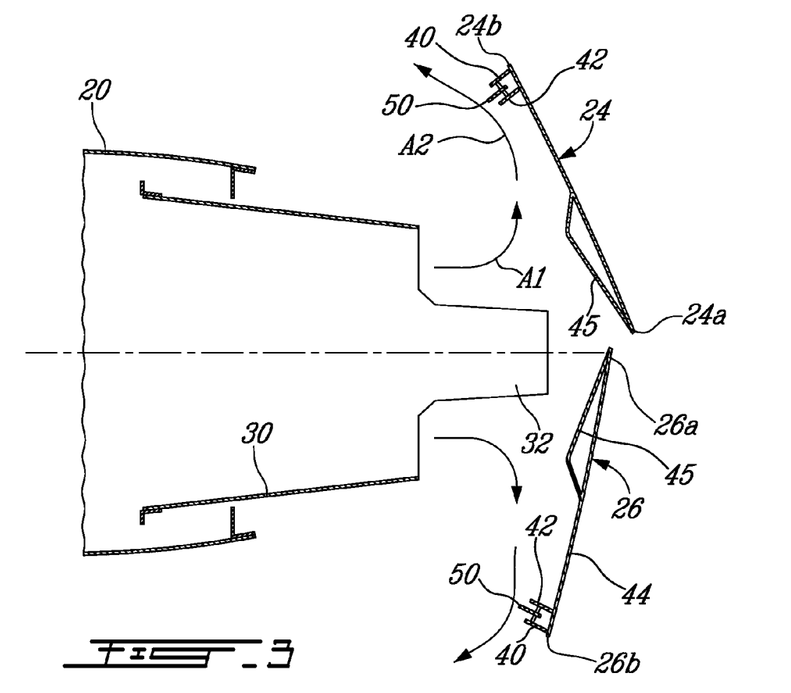
FIG. 3 is a view similar to FIG. 2, showing the doors in a deployed position.

The jet pipe 30 and the side arms 32 are shown in FIGS. 2 and 3. The jet pipe 30 is concealed inside the aft section 20*a* of nacelle 20 when the doors 24, 26 are in their stowed position, as in FIG. 1.

FIG. 2 schematically shows an example of the interior side of the thrust reverser 22. FIG. 3 shows the doors of FIG. 2 being in a deployed position. These figures show the relative position of the jet pipe 30 with reference to the nacelle 20. FIG. 2 shows that the leading edges 24*b*, 26*b* of the doors 24, 26 and their outer wall 44 form a smooth continuity with the upstream parts of the nacelle 20 when in the closed position.

The arrows in FIG. 3 indicate the main flow path when the engine is operated during the thrust reversal. As can be seen, gases coming out of the engine are deviated substantially toward the front. The gases exit the doors 24, 26 in the vicinity of their leading edges 24*b*, 26*b*. These edges are located at the front of the doors 24, 26 and are referred to as "leading" edges with reference to the travel path of the aircraft.

The deviation of the gases creates a resulting horizontal retarding force opposing the forward movement of the aircraft. Increasing the output thrust generated by the engine creates an increasing aerodynamic decelerating force.

In the illustrated example seen in FIG. 3, the trailing edge 24*a* of the upper door 24 is pivoted behind the trailing edge 26*a* of the lower door 26, this resulting from the asymmetrical positioning of the pivots with reference to the horizontal center plane of the jet pipe 30 as disclosed in applicant's co-pending application Ser. No. 11/534,202, filed Sep. 21, 2006. The operation of the presently-described concept, however, is not dependent on such a door and pivot configuration, and any suitable arrangement may be employed.

It should be noted that although the doors 24, 26 are described herein and shown in the drawings as being an upper reverser door 24 and a lower reverser door 26 movable in a vertical plane, doors can also be configured as left and rights door movable in a horizontal plane.

Likewise, the skilled reader will appreciate that it is possible to provide an arrangement using the present invention in which the trailing edge 26a of the lower door 26 opens behind the trailing edge 24a of the front door 24, as mentioned above, and other arrangements of the trailing edges 24a, 26a are also available.

Other door arrangements employing the present invention are possible, as well, and therefore this description is not to be understood as limited to the door mounting orientation and configuration depicted, nor the target/bucket type depicted.

Doors 24, 26 have an outer skin 44 extending from their leading edge to their trailing edge, and a partial inner skin 45 extending from the door's leading edge to a point roughly halfway intermediate the leading and trailing edges. This construction results in a single skin 44 being present in the vicinity of the door leading edge.

The skilled reader will appreciate that double-skin doors provide structural advantages, but are correspondingly heavier than single skin designs. The presently-described "hybrid" single-and-double skin construction thus has advantages over other constructions, including permitting control of airflow in the vicinity of the trailing edge, as will now be further described.

The leading edges 24b, 26b of the doors 24, 26 comprise a first and a second arc-shaped radial frame 40, 42 disposed across the interior side of single-skin wall 44 and extending circumferentially along the leading edges 24b, 26b. The first and second frames 40, 42 are spaced apart from each other and project substantially radially relative to a curvature of the doors 24, 26. These radial frames 40, 42 have a structural function, to stiffen skin 44, and, in this example, preferably have substantially the same height, as in many of the illustrated examples.

A third arc-shaped radial frame member 50 is provided, in this embodiment, extending between the first and second radial frames 40, 42. This third frame, referred to hereinbelow as the kicker frame 50, has a height greater than the first and second radial frames 40, 42 when the kicker frame 50 is mounted to the door 24, 26.

Thus, the distal edge of the kicker frame 50 extends beyond the first and second radial frames 40, 42. The kicker frame 50 is preferably mounted to the door 24, 26 in any suitable fashion, such as being connected to the other radial frames 40, 42 using any appropriate arrangement. Also preferably, the kicker frame 50 is mounted in a manner allowing its axial position relative to the door to be selectively adjusted with reference to the first and second radial frames 40, 42, as described below.

As can be appreciated, and as best shown in FIG. 3, the position of the kicker frame 50 affects the "effective" or aerodynamic length of their respective door 24, 26 since each kicker frame 50 redirects the flow of gases closer to the horizontal. The kicker frame 50 has an aerodynamic function, namely to intercept the reverse efflux and deflect it in a more forward thrust direction—i.e. as if the door were geometrically longer than it in fact is, and thus improves the overall efficiency of the thrust reverser. The kicker frame 50 is preferably mechanically connected to the two radial frames 40, 42, and thus it also serves a structural function.

FIG. 2 also shows that the first and second radial frames 40, 42 of the upper door 24 are separated from each other by a distance "d". The two radial frames 40, 42 have height that is substantially equal to a value that is consistent with the required structural rigidity of the thrust reverser door 24. The distance "d" can be, for example, between 50 mm and 100 mm.

The door length can be characterized by its geometric length L1 and by the so-called "effective length" L2. The length L1 is the geometrical length of the door between its leading and trailing edges 24a, 24b. The effective length L2 is the length between the trailing edge 24a of the door 24 and the second radial frame 42.

Adjusting the position of the kicker frame 50 allows varying the effective length between a minimum value up to a maximum value within the range "d". The same principle applies to the lower door 26.

Figure 4:
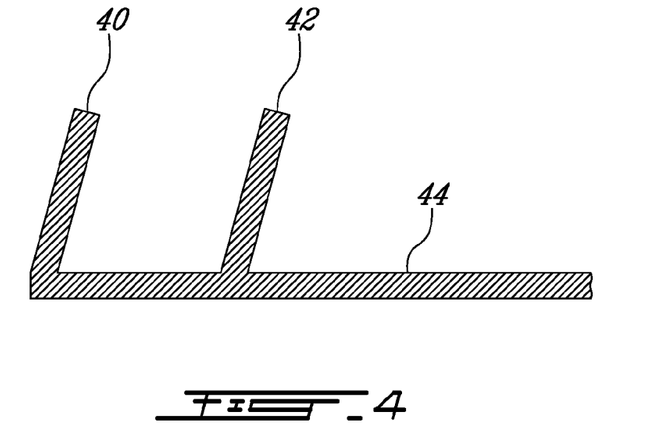
FIG. 4 is a schematic cross-sectional view showing one embodiment of a door.

FIG. 4 schematically shows an example of the first and second radial frames 40, 42 made integral with the wall 44 of the door 24, such as by casting or machining from solid (kicker frame 50 is not depicted, for clarity). Providing the radial frame integrally with the outer skin tends to result in better containment of the reverse efflux as it attaches to the outer skin, although this feature is not critical to operation of the presently-described concept.

Figure 5:
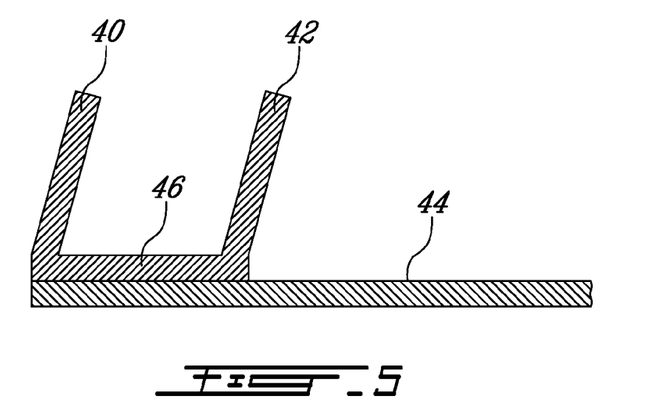
FIG. 5 is a view similar to FIG. 4, showing another embodiment of a door.

FIG. 5 is a similar view (also shown without kicker frame 50, for clarity), showing another example where the first and second radial frames 40, 42 are part of an element 46 having a U-shaped section and that is connected to the wall 44 of the door 24 using an appropriate arrangement, such as bolts, rivets, welding, etc. Other suitable arrangements are possible as well, and it is understood that the invention is not limited to the connection means shown.

FIGS. 4 and 5 show that the first and second radial frames 40, 42 may deviate by a small angle with reference to a perpendicular extending from the wall 44 of the door 24. When the doors 24, 26 are deployed, as in FIG. 3, the reverse efflux is then deflected further toward the front of the engine.

Figure 6:
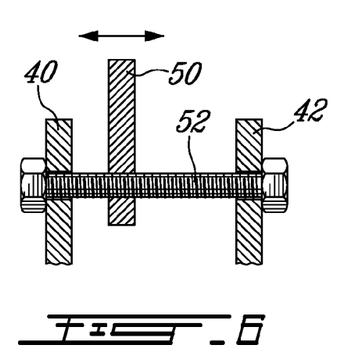
FIG. 6 is a schematic cross-sectional view of one example of a kicker frame mounted to a door.

FIG. 6 is a schematic view showing an example of how the kicker frame 50 may be connected between the first and second radial frames 40, 42. FIG. 6 shows the kicker frame 50 adjustably mounted using a plurality of threaded rods 52 (only one is seen in the figure) longitudinally extending between the first and second radial frames 40, 42. The kicker frame 50 in this arrangement may have a threaded hole, or maybe connected to a follower engaged on the threaded rods 52, or have other suitable means keying the axial position of the rod to the threaded rods.

As mentioned, a plurality of rods 52 are provided circumferentially along the kicker frame 50, to adequately mount the kicker 50 to frames 40, 42. Rotation of the rods 52 will move the kicker frame 50 axially between radial frames 40, 42 which allows, for example, adjusting the effective length of the reverser doors, for example, during development tests of the thrust reverser.

Referring again to FIG. 3, in use, the doors 24, 26 are deployed to redirect engine thrust, as indicated by arrows A1. As the reverse efflux flow flows along the inner side of doors 24, 26, it eventually reaches kicker frame 50, and is then redirected (as indicated by arrows A2 in FIG. 3), more forwardly than it otherwise would have been by the skin 44 of doors 24, 26 or by the frames 42.

It will be understood that the height and axial position of kicker frame 50 on the doors 24, 26 will affect the direction of reverse efflux exiting the thrust reverser. It will also be understood that, while kicker frame 50 could be positioned axially just about anywhere along doors 24, 26, the positioning of kicker frame 50 in the vicinity of the door's leading edge allows better optimization and adjustment of the reverser door effective length. Adjustment of the kicker frame permits optimizing of the reverser door effective length and reversing efficiency without having to change the geometrical length of the doors.

Figure 7:
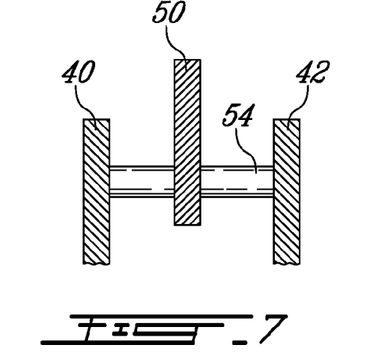
FIG. 7 is a view similar to FIG. 6, showing another example of a kicker frame mounted to a door.

FIG. 7 schematically shows an example of a fixed spacer arrangement 54 for holding in desired position the kicker frame 50. In this case, the kicker frame 50 is in a fixed position relative to frames 40, 42. This arrangement allows the relative position of the kicker to be fixed on the doors 24, 26, for instance in a final desired state on the thrust reverser 22 as certified for flight on a particular aircraft.

Spacers of different widths can be used on different aircraft, which facilitates the use of doors 24, 26 of a particular configuration on more than one thrust reverser design (i.e. allows commonality of doors between designs on multiple aircraft designs employing the same engines). This provides many advantages for manufacturing and maintenance, etc, such as part count reduction, etc.

Figure 8:
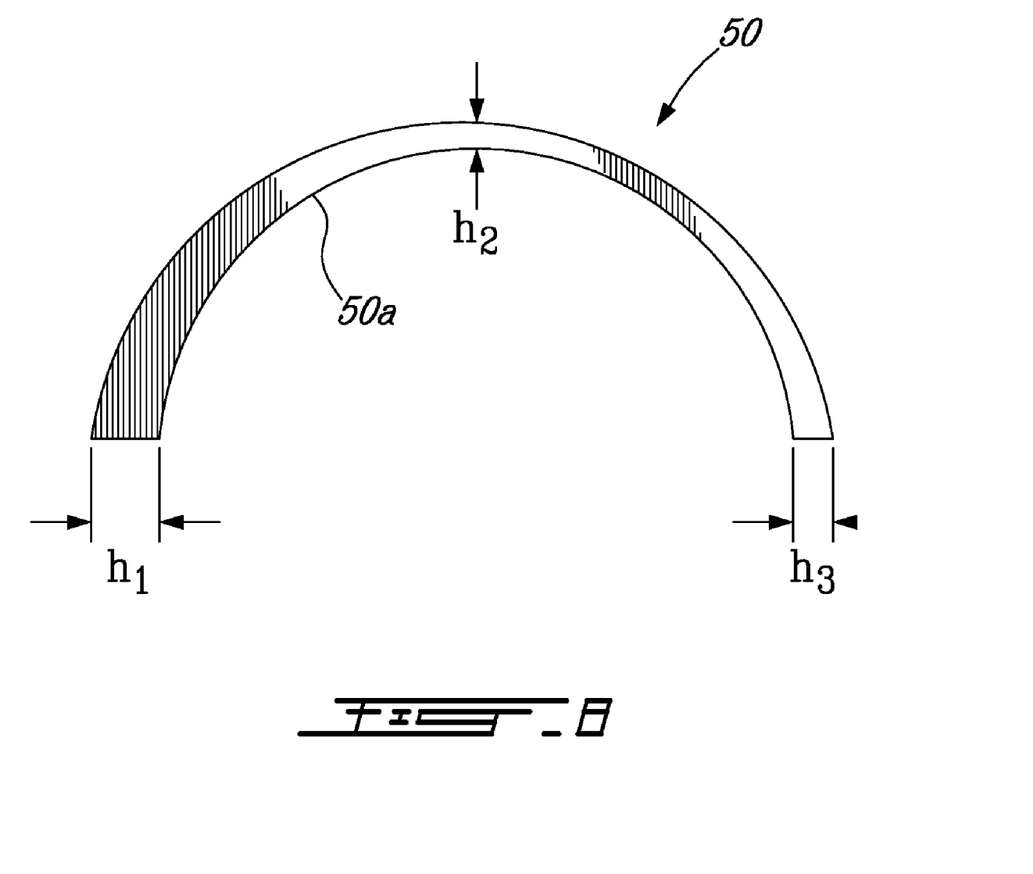
FIG. 8 is a schematic elevation view illustrating another embodiment of the kicker frame.
Figure 9:
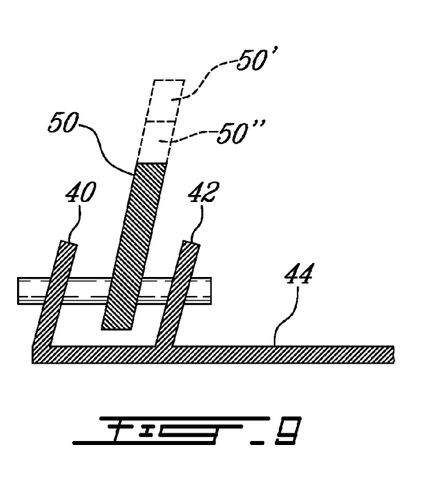
FIGS. 9 to 12 show alternate embodiments of the present concept.

FIG. 8 schematically illustrates an example of a variable height profile for the kicker frame 50, as viewed from beyond the edge of the first or the second kicker radial frame 40, 42. This figure shows that the height of the kicker frame 50, with reference to the interior wall of a given door, may be varied so as to orient the gases coming out of the thrust reverser 22 in a specific direction, and thus provide an asymmetric reverse efflux which permits optimization of the thrust reverser's performance.

In the illustrated example, the height h1 is larger than the height h3, which is larger than the height h2 at the center of the kicker frame 50. For optimization of the direction of the reverse efflux, other suitable configurations (for example, h1>h2>h3, not shown, or h1=h3>h2, not shown, etc.) and kicker frame shapes are possible, as well. It will also be understood that a kicker frame 50 may have a substantially constant height (h1=h2=h3), but be mounted off-center relative to frames 40, 42, thus yielding a similar aerodynamic effect on the reverse efflux flow.

Overall, as can be appreciated, the length of the doors 24, 26 can now be modified in a given range to fit the requirements and it does so without the need of remanufacturing the doors.

The above description is meant to be exemplary only, and one skilled in the art will recognize that many changes may also be made to the embodiments described without departing from the inventions disclosed.

For instance, the kicker frame 50 need not be located between frames 40, 42, but may be located in any suitable fashion.

Also, as described above, rather than (or in addition to) adjusting an axial position of the kicker frame 50, the kicker frame 50 may be configured to be adjustably extended into the reverse efflux flow, such as by mounting it higher with respect to frames 40, 42.

Figure 10:
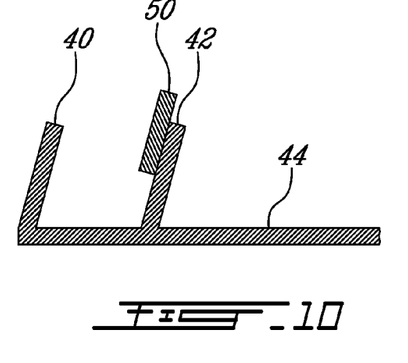
Figure 11:
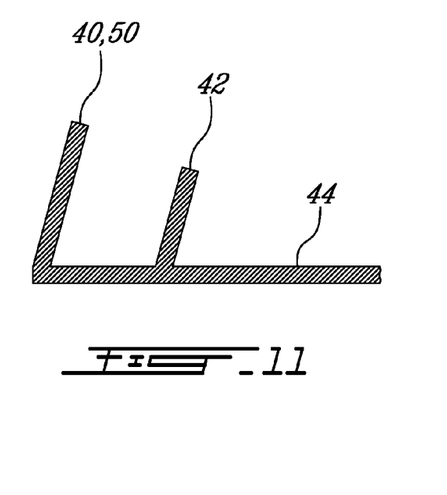
Figure 12:
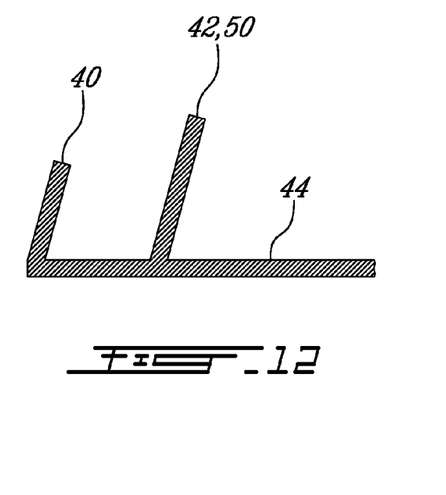

Referring to FIGS. 10, 11 and 12, the function of kicker frame 50 may be integrated with one of the radial structural frames 40, 42. In the embodiments of FIGS. 11 and 12, it will be understood that the axial position of the kicker frame 50 is not adjustable, per se, as in previous embodiments, however the height h2 (not indicated in FIGS. 9 to 12) may be "adjusted" such as through grinding or other mechanical means, or in any suitable fashion, by removing portions 50' and 50".

The shapes of the doors and the configuration of these doors with reference to each other may be different to what is shown. The first and the second radial frames can be differently shaped and/or positioned relative to one another.

One or both of the first and the second radial frames may be omitted, or supplemental members may be provided, as it will be understood that many other suitable arrangements to support the kicker frame are available, and that the present concept is not limited to the exemplary frames described.

Although the kicker frame is preferably mounted to the first and second frames, the kicker frame may be mounted to the door in any suitable manner.

Still other modifications which fall within the scope of the present invention will be apparent to those skilled in the art, in light of a review of this disclosure, and such modifications are intended to fall within the appended claims.

What is claimed is:

1. A thrust reverser having at least one thrust reverser door pivotable between stowed closed and deployed open positions, the at least one door comprising a transverse leading edge having a first, second and third frames axially spaced apart from one another to define a radially open channel therebetween and disposed circumferentially adjacent said leading edge, the first, second and third frames projecting inwardly from an interior side of the at least one door, the third frame mounted to the first and second frames, the third frame extending inwardly beyond inward terminal edges of the first and second frames in said door stowed position.

2. The thrust reverser as defined in claim 1, wherein the third frame is mounted to the first and second frames by a mounting apparatus, the mounting apparatus providing a plurality of axial mounting positions for the third frame relative to the first and second frames.

3. The thrust reverser as defined in claim 2, wherein the axial mounting positions for the third frame are infinitely variable relative to the first and second frames.

4. The thrust reverser as defined in claim 1, wherein the third frame has a varying height along its circumferential length.

5. The thrust reverser as defined in claim 1, wherein the at least one door comprises a single skin extending between the first and second frames.

6. The thrust reverser as defined in claim 5, wherein the second frame is disposed closer to the leading edge than the first frame, and wherein the axial distance between the second frame and the leading edge is less than a distance between the first and second frames.

7. The thrust reverser as defined in claim 1, wherein the third frame is disposed between the first and second frames.

8. A thrust reverser for a turbofan gas turbine engine, the thrust reverser having at least one door movable between a stowed position and a deployed position for deflecting engine thrust, the at least one door having a leading edge with a deflector wall being adjustable in relative position on said at least one door, with said relative position being constant from said stowed position to said deployed position, the wall being generally parallel to the leading edge and extending generally radially inwardly of the at least one door to, in use, redirect engine thrust.

9. The thrust reverser as defined in claim 8, wherein the wall has an infinite number of positions relative to the leading edge.

10. The thrust reverser as defined in claim 8, wherein the wall has a varying height along a length thereof.

11. The thrust reverser as defined in claim 8, wherein the adjustable position is radially inwardly adjustable.

12. The thrust reverser as defined in claim 8, wherein the adjustable position is axially adjustable relative to the leading edge.

13. A thrust reverser comprising at least one door for deflecting engine thrust in a deployed open position thereof, the at least one door having a leading edge and a single skin in a vicinity of the leading edge, the at least one door having at least a first bulkhead extending radially inwardly from the skin, the first bulkhead defining a first member extending generally parallel to the leading edge of the at least one door and being sized and configured relative to the skin to structurally stiffen the skin, the at least one door also having a second member extending radially relative to the skin and disposed adjacent the first member, the at least one door further having a third member extending generally parallel to the leading edge of the at least one door and being sized and configured relative to the skin to structurally stiffen the skin, with the first and third members defining a radially open channel therebetween, the second member having a radial height relative to the skin which is greater than a radial height of the first member in a stowed closed position of said at least one door.

14. The thrust reverser as defined in claim 13, wherein the radial height of the second member varies along a circumferential length.

15. The thrust reverser as defined in claim 13, wherein the second member is mounted to the first member.

16. The thrust reverser as defined in claim 13 wherein the second member is mounted to the first and third members.

17. A method of adjusting an effective length of a thrust reverser door, the method comprising:
mounting a substantially radially projecting member inside the thrust reverser door generally parallel and adjacent to a leading edge of the door;
deploying the door from stowed closed to deployed open positions with the member having a constant relative position on the door;
deflecting gases with the member during a thrust reversal mode when the door is in said deployed position; and
changing said relative position of the member relative to the door to thereby change an aerodynamic effective length of the door.

18. The method as defined in claim 17 wherein the step of changing comprises adjusting an attachment of the member to alter an axial position of the member relative to the door.

19. The method as defined in claim 17 wherein the step of changing comprises adjusting an attachment of the member to alter a radial position of the member relative to the door.

20. The method as defined in claim 17 wherein the step of deflecting comprises deflecting gases asymmetrically relative to the door.

21. A thrust reverser comprising:
a pair of thrust reverser doors pivotally mounted to a jet pipe for moving between stowed closed and deployed open positions;
each of said doors having axially opposite leading and trailing edges and a pair of radial frames extending radially inwardly and circumferentially along said leading edge in said stowed position, and spaced axially apart to define a U-shaped channel open radially inwardly therebetween; and
a kicker frame extending radially inwardly from and circumferentially along said radial frames at said open channel in said stowed position to increase effective aerodynamic length of said doors in said deployed position.

22. A thrust reverser according to claim 21 wherein said kicker frame is mounted axially between said radial frames for selective axial adjustment therebetween.

23. A thrust reverser according to claim 22 wherein said kicker frame is mounted on threaded rods extending axially between said radial frames.

24. A thrust reverser according to claim 22 wherein said kicker frame is mounted between said radial frames with spacers therebetween.

25. A thrust reverser according to claim 21 wherein said kicker frame is integrated in one of said radial frames.

26. A thrust reverser according to claim 21 wherein said kicker frame varies in radial height circumferentially along said door leading edge.

27. A method of using said thrust reverser according to claim 21 comprising:
adjusting axial position of said kicker frame between said radial frames for said stowed position; and
deploying open said doors to correspondingly change said effective aerodynamic length of said doors during thrust reverse operation.

* * * * *